US010899382B2

(12) United States Patent
Bergmann et al.

(10) Patent No.: US 10,899,382 B2
(45) Date of Patent: Jan. 26, 2021

(54) HYDRAULIC STEERING DEVICE

(71) Applicant: HYDRAULIK NORD FLUIDTECHNIK GMBH & CO. KG, Parchim (DE)

(72) Inventors: Erhard Bergmann, Banzkow / OT Mirow (DE); Toralf Käckenmeister, Raduhn (DE); Markus de la Motte, Muchow (DE)

(73) Assignee: DANFOSS POWER SOLUTIONS PARCHIM GMBH, Parchim (DE)

( * ) Notice: Subject to any disclaimer, the term of this patent is extended or adjusted under 35 U.S.C. 154(b) by 227 days.

(21) Appl. No.: 16/142,571

(22) Filed: Sep. 26, 2018

(65) Prior Publication Data

US 2019/0111967 A1 Apr. 18, 2019

(30) Foreign Application Priority Data

Oct. 12, 2017 (DE) ........................ 10 2017 123 767

(51) Int. Cl.
*B62D 5/30* (2006.01)
*B62D 1/22* (2006.01)
(Continued)

(52) U.S. Cl.
CPC ................. *B62D 5/30* (2013.01); *B62D 1/22* (2013.01); *B62D 5/09* (2013.01); *B62D 5/091* (2013.01);
(Continued)

(58) Field of Classification Search
CPC ... B62D 5/30; B62D 1/22; B62D 5/09; B62D 5/093; B62D 5/091; B62D 5/12;
(Continued)

(56) References Cited

U.S. PATENT DOCUMENTS

| 6,354,393 B1 * | 3/2002 | Ahlert | B62D 5/06 |
| | | | 180/403 |
| 2008/0087014 A1 * | 4/2008 | Schick | B62D 5/091 |
| | | | 60/403 |

(Continued)

FOREIGN PATENT DOCUMENTS

DE   102111112625 A1 * 7/2013
DE   10 2015 121 328 B3   2/2017

OTHER PUBLICATIONS

Machine Language translation of DE 10211112625 obtained from www.espacenet.com on Jul. 2, 2020.*

*Primary Examiner* — Ruth Ilan
*Assistant Examiner* — Marlon A Arce
(74) *Attorney, Agent, or Firm* — Norris McLaughlin, P.A.

(57) ABSTRACT

The invention relates to a hydraulic steering device that hydraulically connects a steering cylinder to a supply system, whereby the supply system is hydraulically operatively connectable to the steering cylinder via a steering valve to form a main flow connection and the supply system is hydraulically operatively connectable to the steering cylinder via a flow regulation valve arrangement to form a branch flow connection that circumvents the main flow connection, whereby the flow regulation valve arrangement is triggerable by an electric control unit and the flow regulation valve arrangement comprises valve groups that are triggerable individually, which are respectively connected in the forward flow and return flow of the branch flow connection and a release-shutoff valve is assigned to the flow regulation valve arrangement. It is provided that the release-shutoff valve is connected between the flow regulation valve arrangement and the steering cylinder.

4 Claims, 1 Drawing Sheet

(51) Int. Cl.
| | |
|---|---|
| *B62D 5/09* | (2006.01) |
| *B62D 5/093* | (2006.01) |
| *B62D 5/32* | (2006.01) |
| *B62D 5/07* | (2006.01) |
| *F15B 13/04* | (2006.01) |
| *F15B 11/08* | (2006.01) |
| *B62D 5/12* | (2006.01) |

(52) U.S. Cl.
CPC ............... *B62D 5/093* (2013.01); *B62D 5/07* (2013.01); *B62D 5/12* (2013.01); *B62D 5/32* (2013.01); *F15B 11/08* (2013.01); *F15B 13/0401* (2013.01)

(58) Field of Classification Search
CPC ... B62D 5/07; B62D 5/32; F15B 11/08; F15B 13/0401
See application file for complete search history.

(56) References Cited

U.S. PATENT DOCUMENTS

| | | | |
|---|---|---|---|
| 2014/0060684 A1* | 3/2014 | Tauber | F16K 31/56 137/613 |
| 2017/0144693 A1* | 5/2017 | Okubo | B62D 5/046 |
| 2018/0297632 A1* | 10/2018 | Emmert | B62D 1/22 |
| 2018/0362072 A1* | 12/2018 | Bergmann | F15B 20/008 |
| 2019/0002018 A1* | 1/2019 | Bergmann | B62D 5/09 |

* cited by examiner

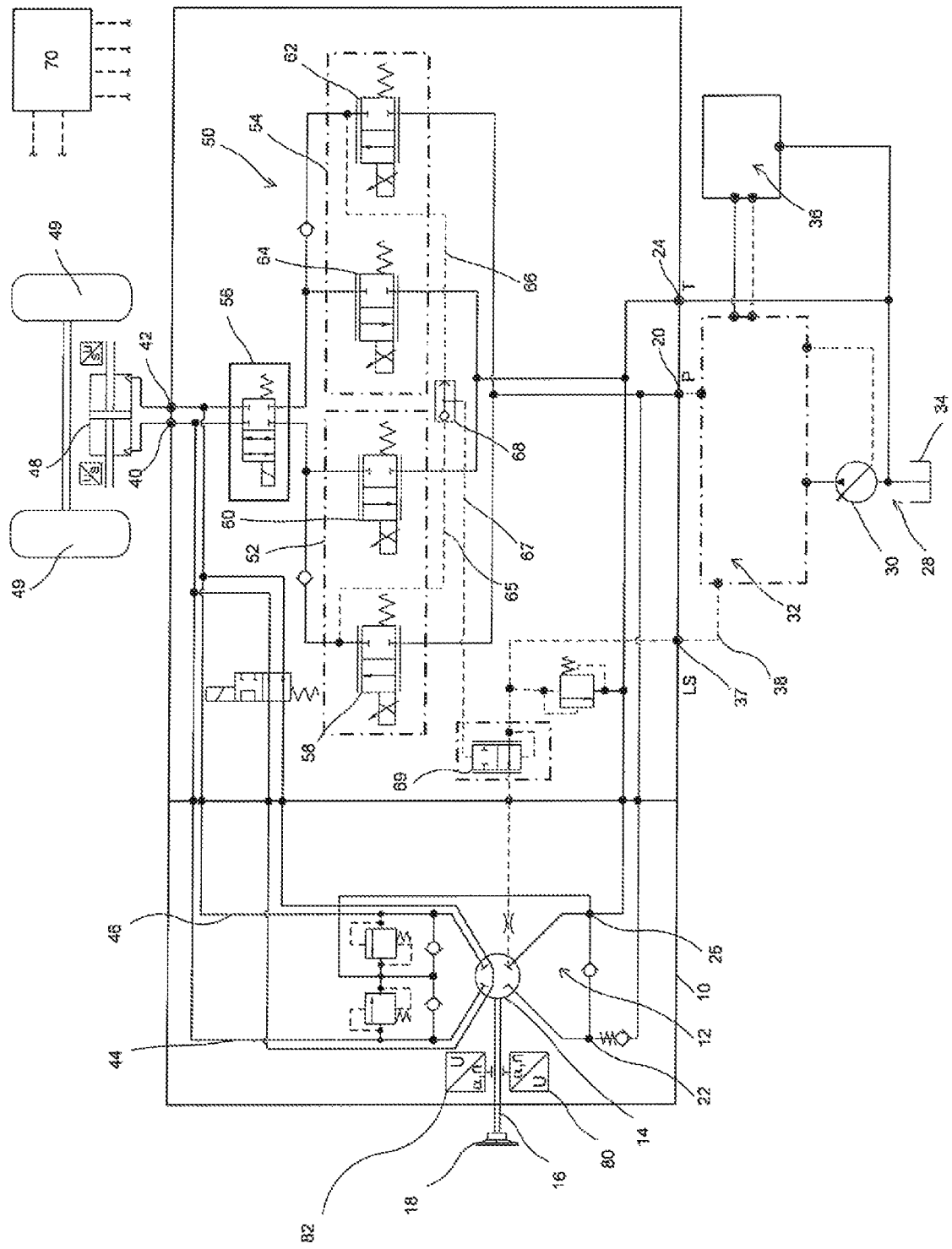

HYDRAULIC STEERING DEVICE

BACKGROUND OF THE BACKGROUND

The invention relates to a hydraulic steering device.

Hydraulic steering devices, such as in the motor vehicle sector, are generally known to persons skilled in the art. Such a hydraulic steering device is described in the generic DE 10 2015 121 328 B3.

The core component of such hydraulic steering devices is a steering cylinder which is hydraulically connected to a supply system. The supply system is here hydraulically operatively connectable to the steering cylinder via a steering aggregate in the sense of a main flow connection. Via the steering aggregate, the steering cylinder can for example be triggered via a manual steering wheel. Further, it is known with hydraulic steering devices that a branch flow connection can be created for the mechanised or automatic triggering of the steering cylinder. For this purpose, the supply system is flexibly hydraulically operatively connected to the steering cylinder via a flow regulation valve arrangement, passing the main flow connection. The flow regulation valve arrangement can for this purpose comprise several independently triggerable valves, with which forward and return flows to operating chambers of the steering cylinder can be set. Via a control unit with steering software, the valves can, in the known manner, be triggered to realise a steering function.

It is further known that the flow regulation valve arrangement can be assigned a release and shutoff valve. In the prior art, this release and shutoff valve is connected between the flow regulation valve arrangement and the supply system.

The object of the invention is to create a generic hydraulic steering device in which pressure losses can be reduced.

SUMMARY OF THE INVENTION

Due to the fact that the release and shutoff valve is connected between the flow regulation valve arrangement and the steering cylinder, it is advantageously possible to reduce pressure losses on the hydraulic steering device. This has the advantage that a hydraulic conveyor device of the supply system does not have to operate against pressure. In particular in cases when no steering request is made to the hydraulic steering device, the load pressure can be compensated.

In a preferred embodiment of the invention, it is additionally provided that when a steering movement is not requested, the release and shutoff valve is in the closed position, and the valves of the flow regulation valve arrangement that are connected to a return flow connection of the steering device are in an open position. As a result, in a particularly simple manner, the load pressure can be compensated. The cylinder fixation of the steering cylinder is retained in accordance with the steering position that has just been selected, and the load on the flow regulation valve arrangement is relieved at the same time.

As a result, it remains advantageously possible to optimise the valves of the flow regulation valve arrangement such that these can be designed with a larger through-flow in mind.

Due to the fact that the internal pressure losses are reduced in the hydraulic steering device, these larger oil quantities can be provided.

BRIEF DESCRIPTION OF THE DRAWINGS

The invention will now be explained in greater detail below with reference to an exemplary embodiment and the related drawing, in which:

FIG. 1 shows a representation of the basic principles of a hydraulic steering device according to the invention.

FIG. 1 shows a representation of the basic principles of a hydraulic steering device according to the invention. The hydraulic steering device 10 comprises a steering valve 12 with a rotary disc-controlled dosage pump 14, which is connected via a steering linkage 16 to a manual steering wheel 18.

DETAIL DESCRIPTION OF THE INVENTION

The steering device 10 has an inflow connection 20 that is connected to a first inlet 22 of the steering valve 12. The steering device 10 further has a return flow connection 24, which is connected to an outlet 26 of the steering valve 12.

A supply system, which is assigned the numeral 28 overall, is connected to the inflow connection 20 or the return flow connection 24. The supply system 28 comprises a supply pump 30, which is connected via a flow divider valve 32 to the inflow connection 20. Further, a tank 34 is provided, which is connected to the return flow connection 24. The flow divider valve 32 forms a priority valve, by means of which a supply operation of the supply pump 30 can be controlled between an operating hydraulic system 36 and the steering device 10.

Via a load connection 37 and a control line 38, the flow divider valve 32 receives a signal when a request is made by the hydraulic steering device 10 that assigns priority to the hydraulic steering device 10 over the operating hydraulic system 36.

The steering device 10 further has cylinder connections 40 and 42. The cylinder connection 40 is connected via a line 44 and the cylinder connection is connected via a line 46 to the steering valve 12. A steering cylinder 48 is connected to the cylinder connections, which is connected in a manner that is not shown to steerable wheels 49 of a vehicle. The connection 40 is connected to a chamber responsible for the steering direction to the left and the connection 42 is connected to a chamber of the steering cylinder 48 that is responsible for the steering direction to the right.

Thus, a main flow connection is formed from the supply pump 30 via the flow divider valve 32 and the steering valve 12 to the steering cylinder 48 and from the steering cylinder 48 back via the steering valve 12 and the tank 34.

The steering device 10 further comprises a flow regulation valve arrangement 50.

The flow regulation valve arrangement 50 has a first valve group 52 and a second valve group 54 and a release-shutoff valve 56. The valve group 52 comprises a valve 58 formed as an inflow valve and a valve 60 formed as a return flow valve. The valve group 54 comprises a valve 62 formed as an inflow valve and a valve 64 formed as a return flow valve. The valves 58, 60, 62 and 64 are in each case formed as proportional valves, which are known to persons skilled in the art. With such proportional valves, with non-actuated magnets, a control piston is held by a compression spring in an initial position and blocks the volume flow. Through the excitement of the magnet, the control piston is directly adjusted—proportionate to the electrical input signal. The valves 58 and 60 are connected or connectable to the cylinder connection 40 and the valves 62 and 64 are connected or connectable to the cylinder connection 42 via the release valve 56. The flow regulation valve arrangement 50 further contains a shuttle valve 68, which is connected via load signal lines 65 and 66 to the outlet of the valves 58 and 62. The shuttle valve 68 is also connected to a copy valve 69 via a load signal line 67. The pressure signal on the exit of the valves 58 and 62 can as a result be transferred to the copy valve 69 and via the control line 38 to the supply pump 30.

Thus, from the supply pump 30 via the flow regulation valve arrangement 50 to the steering cylinder 48 and from the steering cylinder 48 back via the flow regulation valve arrangement 50 and the tank 34, a branch flow connection is formed.

The steering cylinder 48 is therefore operatively connected via the steering valve 12 to the supply system 28 via a main flow connection and via the flow regulation valve arrangement 50 via a branch flow connection that circumvents the main flow connection. For triggering purposes, the valves 58, 60, 62 and 64 which are designed as proportional valves and the release valve 56 are connected via control lines, not shown, to a control unit 70.

If the release-shutoff valve 56 is now switched via the control unit 70 from its blocking position shown to the through-flow position, the cylinder connection 40 is connected to the valves 58 and 60 and the cylinder connection 42 is connected to the valves 62 and 64. The control unit 70 evaluates the signals provided by the measurement value recorders 82 and 80, which correspond to the desired steering direction, and prepares corresponding triggering signals via the control lines for the valves 58, 60, 62 and 64. Depending on whether a left steering procedure or a right steering procedure is conducted via the steering valve 12, i.e. via the manual steering wheel 18, via the control unit 70, either the valve 58 and the valve 64 are triggered when steering left, or the valve 60 and the valve 62 are triggered when steering right. As a result, a defined opening profile is created that provides a branch flow of oil that is proportionate to the main flow of oil. The volume flow of the branch flow of oil is dependent on the pressure difference on the respective valve 58, 60, 62, 64 and the opening profile in accordance with the control signals that are applied by the control unit 70.

If no steering movement takes place, i.e. if no corresponding signals reach the control unit 70 from the measurement value recorders 80 and 82, the release valve 56 is closed. At the same time, the valves 60 and 64 are opened. As a result, a compensation of the load pressure occurs while the cylinder position of the steering cylinder 48 is retained. The load on the valves 58, 60, 62 and 64 and the load signal lines 65, 66 and 67 to the shuttle valve 68 and the copy valve 69 is thus relieved. Since the pump 30 no longer needs to operate against the pressure fixed in the cylinders of, for example, 30 bar, pressure losses can be reduced. Due to the low pressure losses from the inflow connection 20 to the valves 58 and 62, it is thus possible to increase the through-flow quantity of oil through these valves, for example to 60 l/min. The steering support can hereby be improved.

LIST OF REFERENCE NUMERALS

10 Steering device
12 Steering valve
14 Dosage pump
16 Steering linkage
18 Manual steering wheel
20 Inflow connection
22 Inlet
24 Return flow connection
26 Outlet
28 Supply system
30 Supply pump
32 Flow divider valve
34 Tank
36 Operating hydraulic system
37 Load connection
38 Control line
40 Cylinder connection
42 Cylinder connection
44 Line
46 Line
48 Steering cylinder
50 Flow regulation valve arrangement
52 Valve group
54 Valve group
56 Release-shutoff valve
58 Valve
60 Valve
62 Valve
64 Valve
65 Load signal line
66 Load signal line
67 Load signal line
68 Shuttle valve
69 Copy valve
70 Control unit
80 Measurement value recorder
82 Measurement value recorder

The invention claimed is:

1. A hydraulic steering device comprising:
a steering cylinder hydraulically connectable to a supply system,
wherein
the supply system is hydraulically operatively connectable to the steering cylinder via a steering valve to form a main flow connection and hydraulically operatively connectable to the steering cylinder via a flow regulation valve arrangement to form a branch flow connection that circumvents the main flow connection, and
the flow regulation valve arrangement is triggerable by an electric control unit and comprises valve groups that are triggerable individually, which are respectively connected in a forward flow of the branch flow connection and a return flow of the branch flow connection, and
a release-shutoff valve assigned to the flow regulation valve arrangement and connected between the flow regulation valve arrangement and the steering cylinder.

2. The hydraulic steering device according to claim 1, wherein the valve groups comprise a first valve group and a second valve group, the first valve group comprises a first valve that is connectable to an inflow connection and a second valve that is connectable to a return flow connection, and the second valve group comprises a third valve that is connectable to the inflow connection and a fourth valve that is connectable to the return flow connection.

3. The hydraulic steering device according to claim 1, wherein, when the release-shutoff valve is disposed in a through-flow position, a first cylinder connection assigned for the left steering is connected to the first valve and the forth valve and a second cylinder connection assigned for the right steering is connected to the second valve and the third valve.

4. The hydraulic steering device according to claim 1, wherein, with an unrequested steering movement, the release-shutoff valve is disposed in the closed position and the second valve and the forth valve are disposed in the open position.

* * * * *